May 15, 1956      F. E. BACHMAN      2,745,518
BRAKE ROTOR
Filed Aug. 15, 1950      2 Sheets-Sheet 1
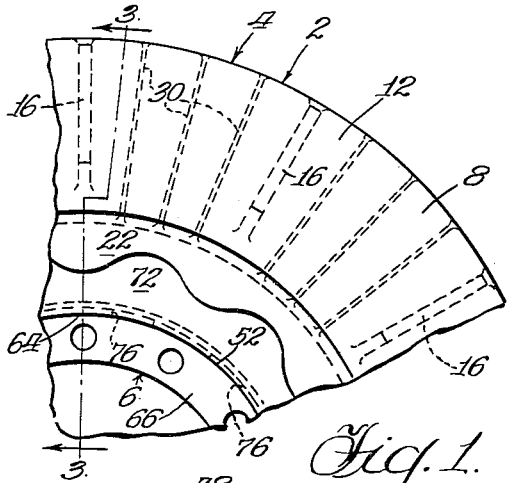
Fig. 1.
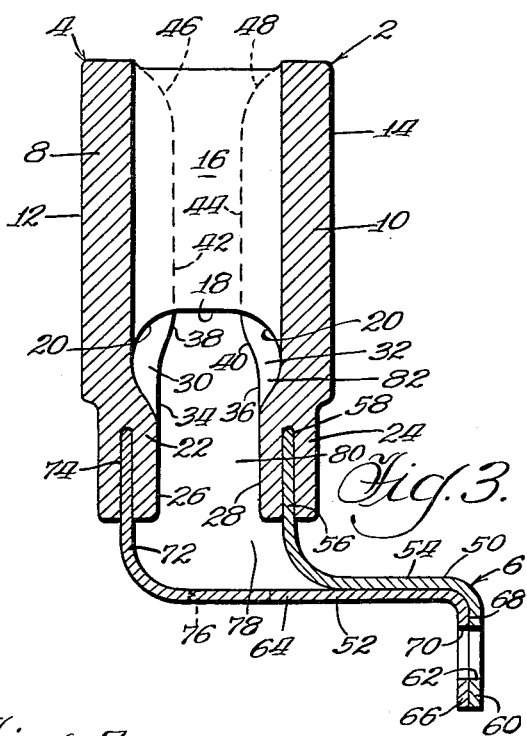
Fig. 3.
Fig. 4.
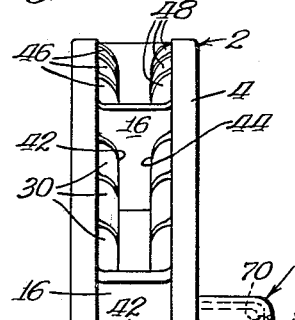
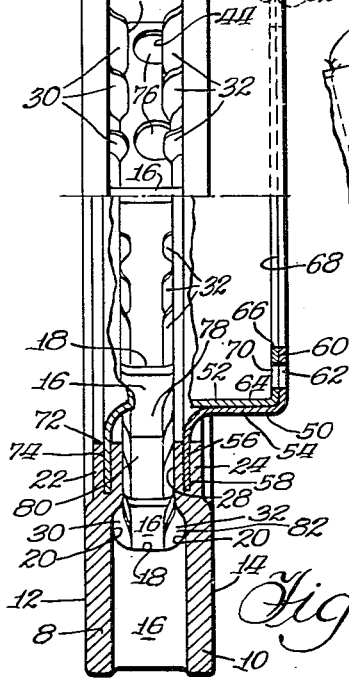
Fig. 2.
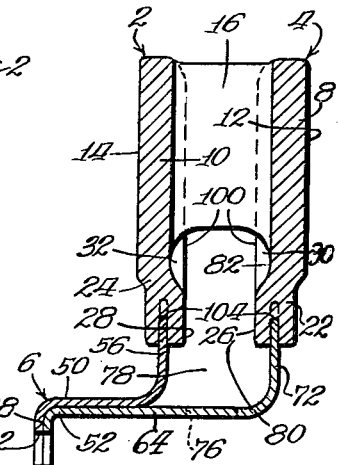
Fig. 5.
INVENTOR.
Fred E. Bachman
BY
Orin O. B. Garner
Atty.

May 15, 1956     F. E. BACHMAN     2,745,518
BRAKE ROTOR

Filed Aug. 15, 1950     2 Sheets-Sheet 2

INVENTOR.
Fred E. Bachman
BY
Arun O.B. Garner Atty.

United States Patent Office 2,745,518
Patented May 15, 1956

2,745,518

BRAKE ROTOR

Fred E. Bachman, St. Louis, Mo., assignor to American Steel Foundries, Chicago, Ill., a corporation of New Jersey Application August 15, 1950, Serial No. 179,621

9 Claims. (Cl. 188—218)

This invention relates to railway brake equipment and more particularly to a brake rotor.

A general object of the invention is to provide a simple brake rotor or disk which may be economically manufactured and which will withstand the severe abuse encountered in service.

A more specific object of the invention is to provide a brake rotor comprising two radial friction plates, each plate being connected to a separate hub, whereby the hubs may be made of much thinner section than ordinarily, thereby increasing the resiliency of the hub portion of the brake rotor and more readily accommodating thermal expansion and contraction of the hub portion without developing cracks therein.

A further object of the invention is to provide such a brake rotor wherein the friction plates are offset toward each other at their radially inner peripheries in order to decrease the distance between these plates at their juncture with the hubs, whereby neither hub is made excessively long and thereby providing a strong construction.

A still further object of the invention is to provide, by connecting each plate to its own hub, a more balanced thermal condition in the plates.

A different object of the invention is to strengthen the plates adjacent to their inner peripheries by interconnecting the inwardly offset portions of the plates with the portions of the plates outwardly therefrom by means of radially extending fins.

A still further object is to contour the connections between the fins and the portions of the plates along gentle curves to reduce the susceptibility to fracture or development of cracks at the juncture.

Another object of the invention is to form the inner edges of the plates of scalloplike form to increase the inner perimeters thereof and thereby more readily accommodate expansion and contraction of the plates to thus reduce to the minimum the tendency of the plates to develop cracks at their inner peripheries.

A still further object of the invention is to arrange the hubs in telescoping relationship, thus providing an efficient, light and strong construction.

Another object of the invention is to provide openings through the longer hub to thereby equalize the expansion and contraction between the hubs, the openings serving to admit air between the friction plates, which is impelled outwardly by blades interconnecting the plates.

I have discovered that, where the support plate is connected to only one plate, the friction shoe which engages the other plate wears away more rapidly than the shoe which engages the one plate. This is undesirable because it accelerates wear of the shoe and also because it requires maintenance at shorter intervals than if both shoes wore substantially uniformly. The provision of a hub for each plate is designed to alleviate this condition by more closely matching the thermal behavior of both plates.

The invention contemplates an arrangement of the hubs in such manner as to provide thermal flexibility at their areas of connection with the friction plates of the rotor and to provide rigidity in the support structure in the area of connection of the hubs with an associated member to be braked such as a wheel of a railway car truck.

These and other objects of the invention will become more apparent from the specification and drawings wherein:

Figure 1 is a fragmentary side elevational view of one form of the brake rotor made in acordance with the invention;

Figure 2 is an edge view, partly in radial section;

Figure 3 is an enlarged radial sectional view taken substantially on the line 3—3 of Figure 1;

Figures 4 and 5 illustrate another modification of the invention, Figure 4 being a fragmentary side elevational view thereof and Figure 5 being a sectional view taken substantially on the line 5—5 of Figure 4;

Figure 6:
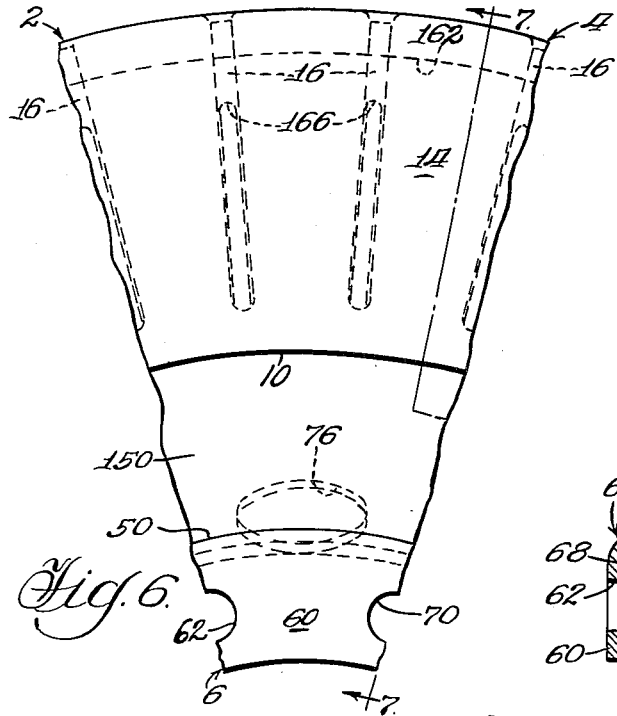
Figure 7:
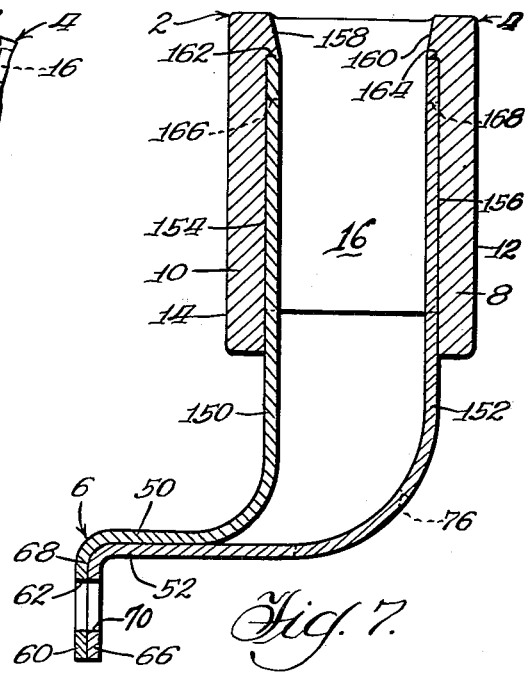
Figure 8:
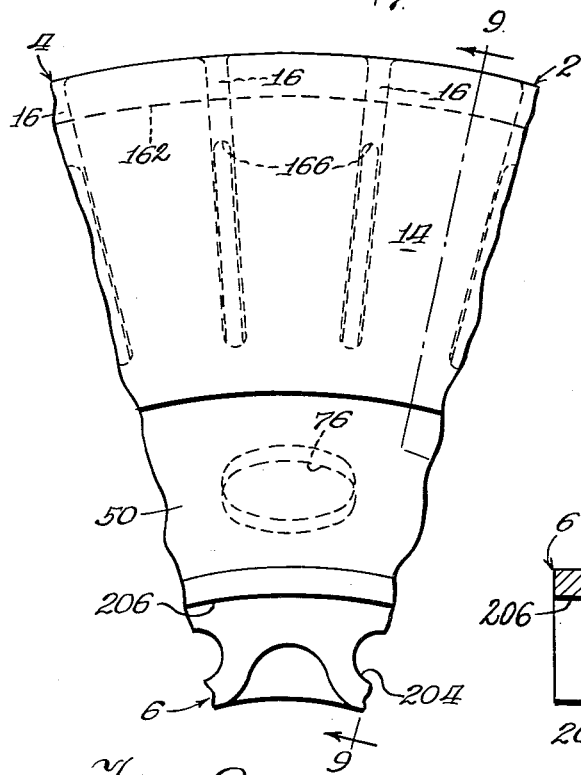
Figure 9:
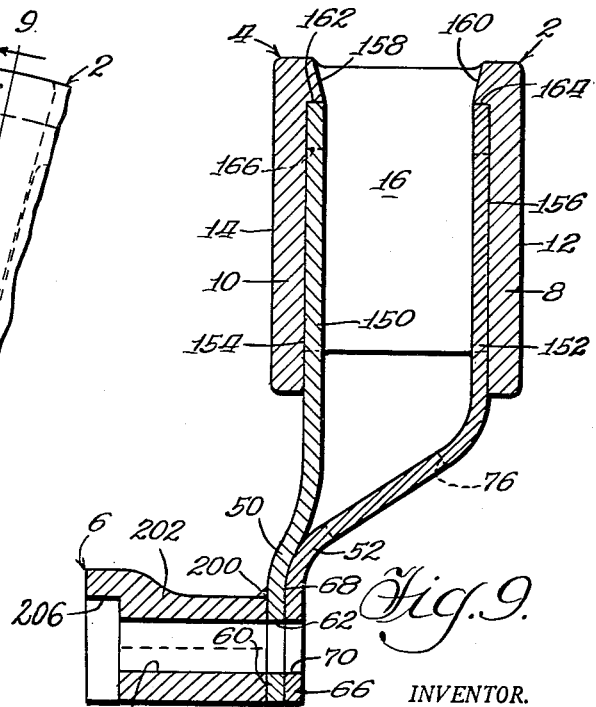

Figures 6 and 7 illustrate a further modification of the invention, Figure 6 being a fragmentary side elevational view thereof, and Figure 7 being a sectional view thereof taken substantially on the line 7—7 of Figure 6; and Figures 8 and 9 illustrate an additional modification, Figure 8 being a fragmentary side elevational view thereof and Figure 9 being a sectional view thereof, taken substantially on the line 9—9 of Figure 8.

Describing the invention in detail and referring first to the embodiment shown in Figures 1 to 3, the brake rotor, generally indicated 2, is an annular structure and comprises a friction ring, generally indicated 4, and a support therefor, generally indicated 6.

The brake ring comprises a pair of flat generally parallel radially extending plates 8 and 10 which provide on their external sides friction surfaces 12 and 14. The plates 8 and 10 are interconnected at regularly spaced intervals by relatively thick radially extending blades 16, 16. The blades are flat and extend widthwise axially of the rotor. The inner ends of the blades as at 18 are substantially flat intermediate their side edges. The inner ends of the blades are formed adjacent to their side edges of arcuate contour as at 20, 20, thus gently merging into the respective plates 8 and 10.

The plates 8 and 10 have offset portions 22 and 24, respectively, at their inner ends, the portions being offset inwardly of the plates toward each other. The inner surfaces 26 and 28 of the offset portions 22 and 24 flare outwardly at their radially outer ends and flow in gentle curves into the inner surfaces of the respective plates 8 and 10. The offset portions 22 and 24 are connected, at the radially outer ends of the sections thereof which are inward of the plates 8 and 10, to the inner sides of the respective plates by a plurality of vanes 30 and 32. It will be seen that the inner ends of the radial edges 34 of the vanes 30 are substantially aligned with the surface 26. Similarly the inner ends of the radial edges 36 of vanes 32 are substantially aligned with surface 28. The surfaces 34 and 36 of the vanes 30 and 32 then converge toward each other as at 38 and 40 and then continue as at 42, 44 in substantially parallel planes and then at their radially outer edges diverge away from each other as at 46 and 48 and flow into the outer perimeters of the respective plates 8 and 10. The sections of the offset portions 22 and 24 which are in line with the respective plates are formed as continuations thereof which provide a strong structure with desirable thermal characteristics.

The support 6 comprises a pair of telescoping outer and inner hubs 50, 52. The outer hub 50 comprises a cylindrical portion 54 which is continued at its inner edge as an outwardly extending flange 56 positioned substantially parallel to the portion 24 and embedded and fused therein as at 58 between the radial sides thereof. The outer end of the sleeve portion 54 of the hub 50 is provided with an inturned flange 60, the flange 60 having openings 62 therethrough accommodating bolts for connecting the hub to an associated railway wheel, as will be readily understood by those skilled in the art.

The inner hub 52 also comprises a cylindrical portion or sleeve 64 which is snugly fitted adjacent to one end within the sleeve 54 of the outer hub. The outer extremity of sleeve 64 comprises an inturned flange 66, which seats as at 68 against the inner side of the flange 60. The flange 66 is provided with openings 70 which are aligned with openings 62 to receive the securing bolts (not shown) therethrough. The other extremity of sleeve 64 is provided with an outturned radial flange 72, the flange being embedded as at 74 into the portion 22 and fused therewith and extending substantially parallel therewith intermediate the inner and outer edges thereof. The sleeve 64 is provided with a plurality of radial openings 76, 76 which are radially aligned with the space 78 between the flanges 56 and 72 of the inner and outer hubs.

It will be seen that a Venturi is provided in that a wide space 78 is formed inwardly of the inner edges of the plates between the portions 56 and 74 of the hubs, this space leading radially outwardly into a narrow space 80 defined between the inner surfaces 26 and 28 of the inwardly offset portions 22 and 24 of the plates 8 and 10, the narrow portion 80 leading into a widened outwardly flaring portion 82 between the principal portions of the plates 8 and 10 and outwardly of the outer extremities of the portions 22 and 24. This arrangement is extremely important in that an efficient thermal condition is afforded to reduce the tendency of cracks developing in the juncture between the support and the brake ring. Also by extending the intermediate portions of the vanes 30 and 32 inwardly of the faces 26 and 28, the efficiency of the blower action is improved without rapidly cooling the inner ends of the vanes 30 and 32 at their juncture with the offset portions 22 and 24. Such a rapid cooling of the vanes 30 and 32 at their juncture would promote thermal cracking.

It will be seen that the provision of the two hubs provides a novel arrangement for dissipating heat at a substantially equal rate from both plates.

Furthermore the hubs, which are preferably made of steel, are made of thinner cross section than is normally possible and yet provide the necessary rigidity. The thinner section of the hubs also improves the bonding or fusing of the cast iron brake ring with the hubs inasmuch as the thinner cross section permits the flanges 56 and 72 to be heated through their entire thickness to substantially the same temperature as the brake ring which is cast therearound. The thinner section also permits greater flexibility and thereby accommodates greater construction and expansion without imposing fatigue stresses of such magnitude as would develop incipient cracks and lead to early failure.

Referring now to Figures 4 and 5 wherein parts identical with those shown in the previous modification are identified by corresponding numerals, it will be seen that the present rotor is substantially the same as the previous one with the exception that the inner edges 100, 100 of the vanes 30 and 32 are in radial alignment with the inner surfaces 26 and 28 of the offset portions 22 and 24. In addition, a mechanical interlock is provided between the outer edges of the flanges 72 and 56 and portions 22 and 24. The mechanical interlock is in the form of spaced separations 102, 102 in the outer peripheries of the flanges 72 and 56 and into which extend inwardly projecting bosses 104 of the respective end portions. In addition, the inner peripheries of the plates are circular.

Referring now to the embodiment shown in Figures 6 and 7 wherein parts identical with those in the previous modifications are identified by corresponding numerals. In the present embodiment the support 6 is larger than in the previous modifications, in that the outturned radial flanges 150 and 152 of the outer and inner hubs 50 and 52 extend along the internal sides of the plates 8 and 10 from their inner peripheries to adjacent their outer peripheries. The external sides of the flanges 150 and 152 are fused as at 154 and 156 to the inner sides of the plates 8 and 10 respectively. The intimate and extensive areas of contact between the flanges 152 and 150 and the related plates afford an efficient heat transfer to the hubs. It will be seen that the plates 8 and 10 are slightly thinner than those shown in the previous embodiments and are recessed at their inner sides to provide inwardly extending shoulders 158 and 160 which at their radially inner edges have complementary abutment along circular surfaces as at 162 and 164, respectively, with the outer edges of the flanges 154 and 156. The secondary vanes in this embodiment are eliminated and the blades 16 are spaced closer together than in the previous embodiments. In addition, the bottom edge of each blade 16 in this embodiment is formed flat.

In addition to an integral bond caused by fusing with the plates and blades, the hubs are afforded a mechanical interlock with the brake ring by means of transverse or axial openings or slots 166 and 168 in the flanges 150, 152 which are narrower than the normal thickness of the blades and through which complementary portions of the radial edges of the blades extend. These portions merge with the interior sides of the plates 8 and 10. The overlap of the blades holds the flanges against the plates.

Referring now to the embodiment shown in Figures 8 and 9, it will be seen that the securement of the support with the brake ring is the same as that shown in Figures 6 and 7. In this embodiment the support also comprises two hubs which are arranged in cupped relationship as are all of the previous embodiments. However, the length of the two hubs is reduced, and the outer hub 50 is welded at 200 on the external side of flange 60 thereof to one end of a cylindrical sleeve 202. The sleeve is provided with openings 204 in axial alignment with openings 62 and 70 in the flanges 60 and 66 of the hubs 50 and 52 to afford means for securing the disk or rotor to an associated railway car wheel, as will be readily understood by those skilled in the art. The other end of the sleeve 202 or spacer is provided with a recess 206 for accommodating the hub of a wheel (not shown) in the usual manner.

I claim:

1. A brake rotor comprising spaced interconnected plates, a separate substantially cylindrical continuous hub for each plate, said plates being cast on the peripheries of the respective hubs, said hubs being arranged in cupped relationship, said plates forming a brake ring and having portions at their inner ends offset toward each other, the offset portions flaring radially outwardly at their outer extremities and arranged with said hubs to provide a venturi at the inner periphery of said brake ring, and openings in at least one of the hubs communicating with the space between the hubs.

2. A brake rotor comprising a brake ring including a pair of cast interconnected friction plates, a support within the ring comprising a pair of hubs, one integral with each plate, said hubs being formed of continuous sleeves surrounding the rotational axis of said rotor, said sleeves being telescoped into each other at one of their ends to provide rigidity in the area of connection to an associated rotatable member to be braked, and having radially extending portions at their other ends spaced apart axially of the rotor to provide flexibility in the areas of connection with the brake ring.

3. In a brake rotor, a brake ring comprising a pair of spaced interconnected friction plates, a pair of hubs, one for each plate, said hubs comprising substantially cylindrical continuous axially extending portions arranged in abutting cupped relationship and having radially extending flexibly metallic portions spaced axially of the rotor and integral with respective plates, said hubs and respective plates being formed and arranged to provide substantially matched thermal characteristics at opposite sides of the rotor.

4. A brake rotor, according to claim 3, wherein said radially extending portions extend along the inner sides of said plates to adjacent the outer perimeters thereof.

5. A brake rotor, according to claim 3, wherein said plates are interconnected by a plurality of radially extending blades and the radially extending portions extend along the inner sides of the plates and are provided with openings therethrough, said blades having portions extending through the openings to interconnect with said radially extending portions and merging with respective plates.

6. A brake rotor, according to claim 3, wherein the plates are interconnected by blades and wherein the blades comprise sections extending through complementary radially elongated slots in said radially extending portions, said sections being thinner than the remaining parts of the blades which extend between the adjacent faces of said radially extending portions and hold said radially extending portions against respective plates.

7. A railway brake rotor comprising a pair of spaced plates, radially extending blades between said plates and interconnecting the same, said plates having portions at their radially inner perimeters inwardly of said blades offset toward each other, said offset portions having their inner sides flaring outwardly at their outer peripheries in gentle curves and flowing into the interior sides of the respective plates, a pair of hubs at the center of the rotor, said hubs comprising substantially cylindrical continuous sleeves, said sleeves being snugly telescoped at one end and having radially outwardly extending flanges at the other end, one of the flanges imbedded in and bonded to the portion of one of the plates and the other flange being imbedded in and bonded to the portion of the other plate, one of said sleeves extending across the space between said plates and having a plurality of openings therethrough in radial alignment with the space between the plates, said flanges providing a space therebetween wider than the space between adjacent sides of said portions which is narrower than the space between said plates to provide a venturi, and axially extending radial vanes on adjacent sides of said plates merging at their inner ends with the outer extremities of those sections of the offset portions of the plates which extend inwardly of the inner sides of the respective plates.

8. A brake rotor comprising spaced interconnected friction plates, a separate hub for each plate, each of said hubs comprising a relatively thin metallic sheet having a peripherally continuous offset portion flaring radially outwardly at the outer extremity thereof, a radially inwardly directed flange in the inner extremity of said hub, said flange and said portion being offset from each other axially of the rotor, a cylindrical sleeve integrally formed with said flange and said portion and disposed to surround the rotational axis of said rotor, the sleeves and the flanges of each of said hubs abutting each other in cupped relationship and forming a support for said rotor, and one of said sleeves having holes therein accommodating air flow radially outwardly between said plates.

9. A brake rotor according to claim 8, wherein the sleeves are formed parallel to the axis of said rotor.

References Cited in the file of this patent
UNITED STATES PATENTS

| Number | Name | Date |
|---|---|---|
| 2,076,538 | Bendix | Apr. 13, 1937 |
| 2,197,232 | Wood | Apr. 16, 1940 |
| 2,208,525 | Eksergian | July 16, 1940 |
| 2,215,420 | Eksergian | Sept. 17, 1940 |
| 2,233,594 | Eksergian | Mar. 4, 1941 |
| 2,255,023 | Eksergian | Sept. 2, 1941 |
| 2,431,741 | Eksergian | Dec. 2, 1947 |
| 2,451,709 | Baselt | Oct. 19, 1948 |